(12) United States Patent
Lim

(10) Patent No.: US 11,755,145 B2
(45) Date of Patent: Sep. 12, 2023

(54) INTERFACE DEVICE INCLUDING A SENSING LAYER TRANSMITTING A DRIVING SIGNAL AND INTERFACE DEVICE DRIVING METHOD USING THE SAME

(71) Applicant: SAMSUNG DISPLAY CO., LTD., Yongin-si (KR)

(72) Inventor: Sanghyun Lim, Cheonan-si (KR)

(73) Assignee: SAMSUNG DISPLAY CO., LTD., Gyeonggi-si (KR)

( * ) Notice: Subject to any disclaimer, the term of this patent is extended or adjusted under 35 U.S.C. 154(b) by 0 days.

(21) Appl. No.: 17/659,437

(22) Filed: Apr. 15, 2022

(65) Prior Publication Data
US 2023/0025138 A1    Jan. 26, 2023

(30) Foreign Application Priority Data
Jul. 21, 2021    (KR) ........................ 10-2021-0095373

(51) Int. Cl.
*G06F 3/041*    (2006.01)
*G06F 3/046*    (2006.01)
*H04M 1/02*    (2006.01)
*G06F 3/044*    (2006.01)

(52) U.S. Cl.
CPC .......... *G06F 3/04166* (2019.05); *G06F 3/046* (2013.01); *G06F 3/0412* (2013.01); *G06F 3/0445* (2019.05); *H04M 1/0266* (2013.01); *H04M 2201/38* (2013.01)

(58) Field of Classification Search
CPC .. G06F 3/04166; G06F 3/0445; G06F 3/0412; G06F 3/046; H04M 1/0266; H04M 2201/38
See application file for complete search history.

(56) References Cited

U.S. PATENT DOCUMENTS

| | | | |
|---|---|---|---|
| 10,979,552 | B2 | 4/2021 | Park et al. |
| 2014/0062948 | A1* | 3/2014 | Lee ................. G06F 3/046 345/174 |
| 2015/0145838 | A1 | 8/2015 | Katsurahira |
| 2018/0329527 | A1* | 11/2018 | Park ................. G06F 3/03545 |
| 2020/0012353 | A1 | 1/2020 | Kim et al. |

FOREIGN PATENT DOCUMENTS

| | | |
|---|---|---|
| KR | 10-2015-0061576 | 6/2015 |
| KR | 10-2020-0005849 | 1/2020 |
| KR | 10-2227274 | 3/2021 |

* cited by examiner

*Primary Examiner* — Lisa S Landis
(74) *Attorney, Agent, or Firm* — F. CHAU & ASSOCIATES, LLC

(57) ABSTRACT

An interface device includes an electronic device and an input device configured to communicate with the electronic device. The electronic device includes a display layer and a sensing layer disposed under the display layer. The sensing layer transmits a first driving signal to the input device and sensing an input generated by the input device. The input device includes a resonance circuit unit in which a first magnetic field is generated based on the first driving signal, a control unit configured to control the resonance circuit unit, and a power supply unit providing power to the control unit. A second magnetic field is generated by the supply in the resonance circuit unit. The sensing layer senses the input based on the second magnetic field.

19 Claims, 14 Drawing Sheets

INTERFACE DEVICE INCLUDING A SENSING LAYER TRANSMITTING A DRIVING SIGNAL AND INTERFACE DEVICE DRIVING METHOD USING THE SAME

CROSS-REFERENCE TO RELATED APPLICATIONS

This application claims priority under 35 U.S.C. § 119 to Korean Patent Application No. 10-2021-0095373, filed on Jul. 21, 2021 in the Korean Intellectual Property Office, the disclosure of which is incorporated by reference herein in its entireties.

TECHNICAL FIELD

The present disclosure relates to a sensing interface device and, more specifically to an interface device and a method for driving an interface device using the same.

DISCUSSION OF THE RELATED ART

Multimedia electronic devices such as a TV, a mobile phone, a tablet computer, a laptop/notebook person al computer (PC), a navigation device, a game console, and the like include an electronic device that displays an image. In addition to utilizing a general input method such as buttons, a keyboard, a mouse, or the like, an electronic device may include a sensor layer capable of providing a touch-based input method that allows a user to enter information or commands easily and intuitively.

The sensor layer may sense touch or pressure applied by the user's body, such as a fingertip, or by a stylus device, which may resemble a pen in use. The use of stylus devices may be better suited for a fine touch input for a user who is accustomed to entering information by using writing instruments or for a specific application (e.g., an application for sketching or drawing).

SUMMARY

An interface device includes an electronic device and an input device configured to communicate with the electronic device. The electronic device includes a display layer and a sensing layer disposed under the display layer. The sensing layer is configured to transmit a first driving signal to the input device and sense an input generated by the input device. The input device includes a resonance circuit unit in which a first magnetic field is generated based on the first driving signal, a control unit configured to control the resonance circuit unit, and a power supply unit providing power to the control unit. A second magnetic field is generated by the power in the resonance circuit unit. The sensing layer senses the input based on the second magnetic field.

The control unit may include a driving control unit transmitting a second driving signal, which is generated based on the power, to the resonance circuit unit and a discharge control unit discharging the resonance circuit unit.

The control unit may include a level shifter receiving a start signal and connected to the resonance circuit unit, a counter connected to the level shifter and starting counting when receiving the start signal, a pulse generator connected to the counter and the level shifter and generating the second driving signal, and a logic element connected to the level shifter, the counter, and the pulse generator.

The control unit may further include a pulse adjustment unit changing a phase and a frequency of the second driving signal and connected to the pulse generator.

The control unit may further include a counting unit changing the number of pulses of the second driving signal and connected to the counter.

The second magnetic field may be generated based on the second driving signal.

The resonance circuit unit may include a first capacitor storing a flow of a current induced by the first driving signal and the second driving signal as an electric field and a first inductor electrically connected to the first capacitor and storing the flow of the current induced by the first driving signal and the second driving signal as a magnetic field.

The input device may further include a second capacitor electrically connected between the resonance circuit unit and the driving control unit.

The input device may further include a second inductor electrically connected between the resonance circuit unit and the driving control unit.

When the first driving signal is provided from the sensing layer, the second inductor may be electrically connected to the resonance circuit unit. When the second driving signal is provided from the driving control unit, the second inductor may be electrically isolated from the resonance circuit unit.

The first capacitor may be connected in series between the driving control unit and the first inductor.

The second capacitor may be a variable capacitor.

The sensing layer may include a digitizer.

A method for driving an interface device includes providing an electronic device and an input device including a control unit and a resonance circuit unit. The electronic device transmits a first driving signal to the input device. The resonance circuit is charged unit by the first driving signal. The input device generates a second driving signal. The resonance circuit unit is charged by the second driving signal. The electronic device detects an input generated by the input device based on the second driving signal for charging the resonance circuit unit.

The generating of the second driving signal may further include starting counting, generating a pulse, and stopping the counting when the counting reaches a limit value.

The method may further include discharging the resonance circuit unit. The discharging of the resonance circuit unit is performed after the detecting, by the electronic device, of the input.

The discharging of the resonance circuit unit may be performed after the stopping of the counting.

The charging of the resonance circuit unit by the first driving signal may include resonating the resonance circuit unit at a first frequency. The charging of the resonance circuit unit by the second driving signal may include resonating the resonance circuit unit at a second frequency different from the first frequency.

The method may further include operating the control unit when a trigger signal reaches a predetermined level. A level of the trigger signal may be changed based on charging the resonance circuit unit.

The operating of the control unit may be performed between the charging the resonance circuit unit by the first driving signal and the generating of the second driving signal.

BRIEF DESCRIPTION OF THE FIGURES

The above and other objects and features of the present disclosure will become apparent by describing in detail embodiments thereof with reference to the accompanying drawings, wherein.

DETAILED DESCRIPTION

Figure 1A:
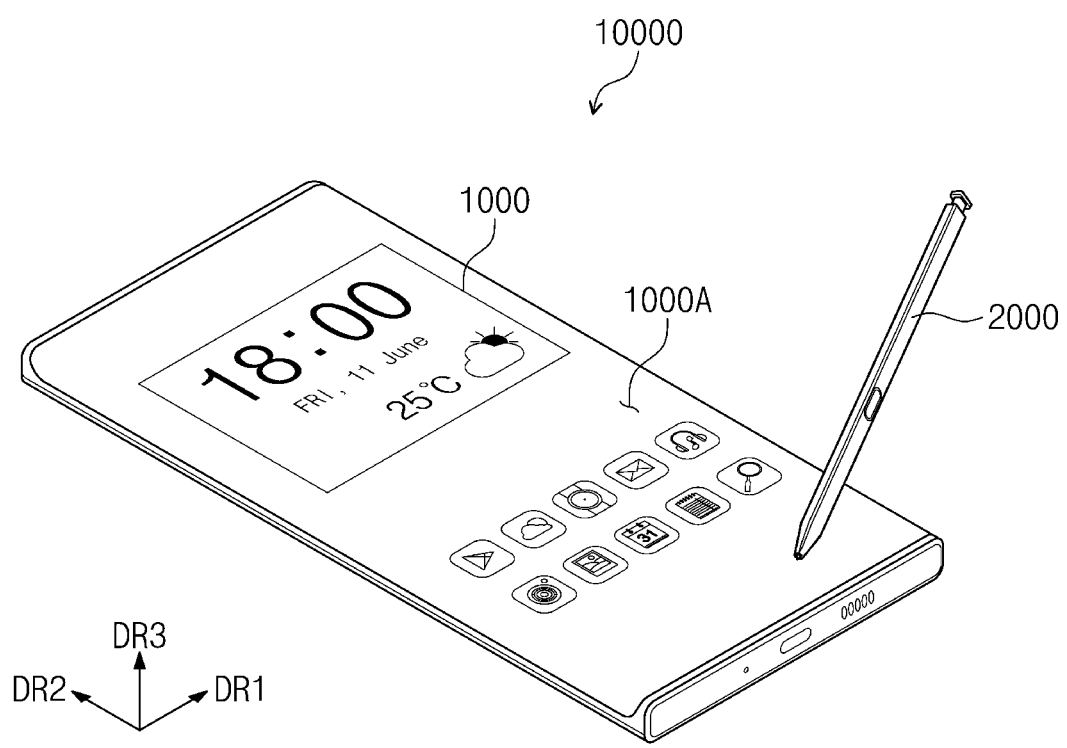
FIG. 1A is a perspective view illustrating an interface device, according to an embodiment of the present disclosure.

In the specification, the expression that a first component (or region, layer, part, portion, etc.) is "on", "connected with", or "coupled with" a second component may mean that the first component is directly on, connected with, or coupled with the second component or means that a third component is interposed therebetween.

The same reference numerals may refer to the same components throughout the specification and the drawings. Also, in drawings, thicknesses, proportions, and dimensions of components may be changed from what is shown and still be considered within the scope of the disclosure, however, it is to be understood that the relative thicknesses, proportions, angles, dimensions, etc. shown do indeed represent at least one particular embodiment of the present disclosure. The expression "and/or" includes one or more combinations which associated components are capable of defining.

Although the terms "first", "second", etc. may be used to describe various components, the components should not necessarily be construed as being limited by the terms. The terms may be used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Hereinafter, embodiments of the present disclosure will be described with reference to accompanying drawings.

FIG. 1A is a perspective view illustrating an interface device, according to an embodiment of the present disclosure.

Referring to FIG. 1A, an interface device 10000 may include an electronic device 1000 and an input device 2000. The electronic device 1000 may detect an input generated by using the input device 2000. This will be described later.

The electronic device 1000 may be a device activated according to an electrical signal. For example, the electronic device 1000 may be a mobile phone (e.g., smartphone), a tablet computer, a display of a computer, a car navigation system, a game console, a wearable device, or another such device. FIG. 1A illustrates that the electronic device 1000 is a mobile phone (e.g., smartphone).

The electronic device 1000 may display an image through an active area 1000A. The active area 1000A may include a surface defined by a first direction DR1 and a second direction DR2. The thickness direction of the electronic device 1000 may be parallel to a third direction DR3 intersected with the first direction DR1 and the second direction DR2. Accordingly, the front surfaces (or upper surfaces) and the bottom surfaces (or lower surfaces) of the members constituting the electronic device 1000 may be defined based on the third direction DR3.

The electronic device 1000 may detect external input. The external input may be a user input. The user input may include various types of external inputs such as a touch by a part of the body of a user (e.g., finger), the input device 2000, light, heat, or pressure. FIG. 1A shows the input device 2000 being used to touch the electronic device 1000. The electronic device 1000 may detect an external input through electro magnetic resonance (EMR) generated between the magnetic field generated inside the electronic device 1000 and the input device 2000.

Figure 1B:
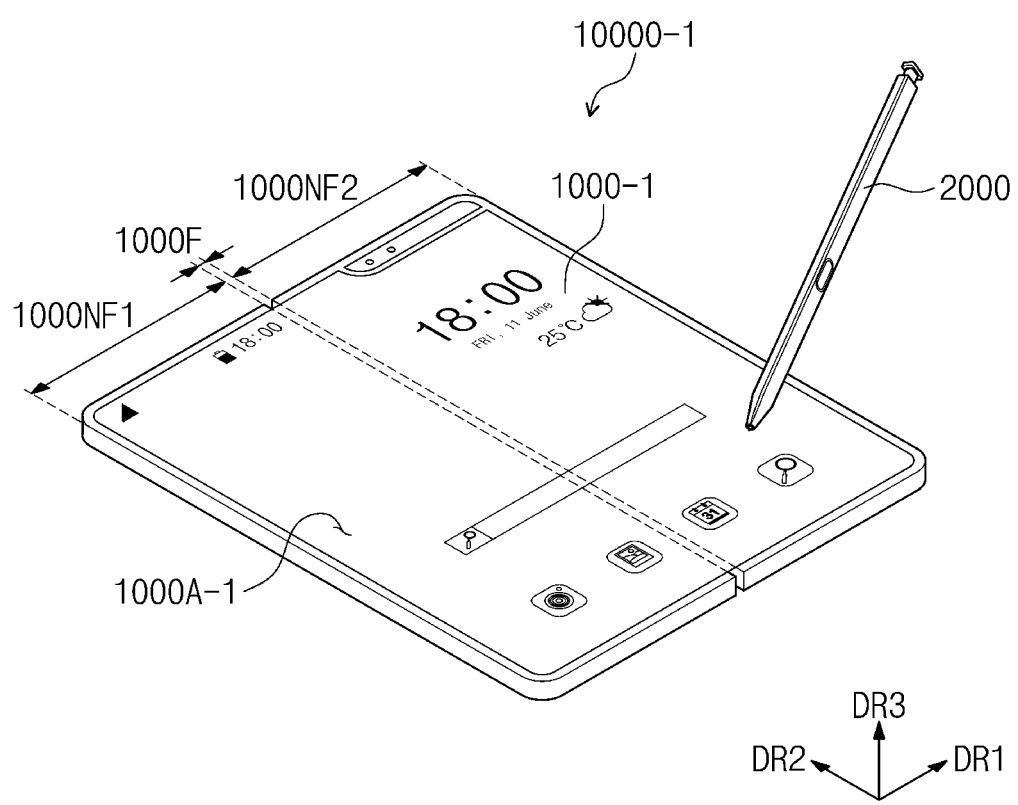
FIG. 1B is a perspective view illustrating an interface device, according to an embodiment of the present disclosure.

FIG. 1B is a perspective view illustrating an interface device, according to an embodiment of the present disclosure. In the description of FIG. 1B, the same reference numerals may be assigned to the same components described through FIG. 1A, and thus to the extent that a detailed description of one or elements has been omitted, it may be understood that those elements are at least similar to corresponding elements described elsewhere within the specification.

Referring to FIG. 1B, an interface device 10000-1 may include an electronic device 1000-1 and the input device 2000.

The electronic device 1000-1 may be a foldable electronic device. A first non-folding area 1000NF1, a folding area 1000F, and a second non-folding area 1000NF2 sequentially arranged in the first direction DR1 may be defined in the electronic device 1000-1. For example, the folding area 1000F may be defined between the first non-folding area 1000NF1 and the second non-folding area 1000NF2.

FIG. 1B illustrates the one folding area 1000F and the first and second non-folding areas 1000NF1 and 1000NF2. However, the number of the folding areas 1000F and the number of the first and second non-folding areas 1000NF1 and 1000NF2 are not necessarily limited thereto. For example, the electronic device 1000-1 may include a plurality of non-folding areas, of which the number is greater than two, and folding areas interposed between the non-folding areas.

The electronic device 1000-1 may display an image through an active area 1000A-1.

When the electronic device 1000-1 is folded, a display surface of the first non-folding area 1000NF1 and a display surface of the second non-folding area 1000NF2 may face each other. Accordingly, when the electronic device 1000-1 is fully folded, the active area 1000A-1 might not be exposed to the outside and may thus be protected. This may be referred to as "in-folding". However, this is only an example, and the present disclosure is not necessarily limited thereto. For example, when the electronic device 1000-1 is folded, the display surface of the first non-folding area 1000NF1 and the display surface of the second non-folding area 1000NF2 may be opposite to each other. Accordingly, in the folded state, the active area 1000A-1 may be exposed to the outside and so the active area 1000A-1 may remain visible even when folded. This may be referred to as "out-folding". Alternatively, the electronic device 1000-1 may be folded inwardly and outwardly. For example, the one folding area 1000F may be folded inwardly and outwardly. Alternatively, the electronic device 1000-1 may include a plurality of folding areas. Some of the plurality of folding areas may be folded inwardly and the others may be folded outwardly.

Figure 2:
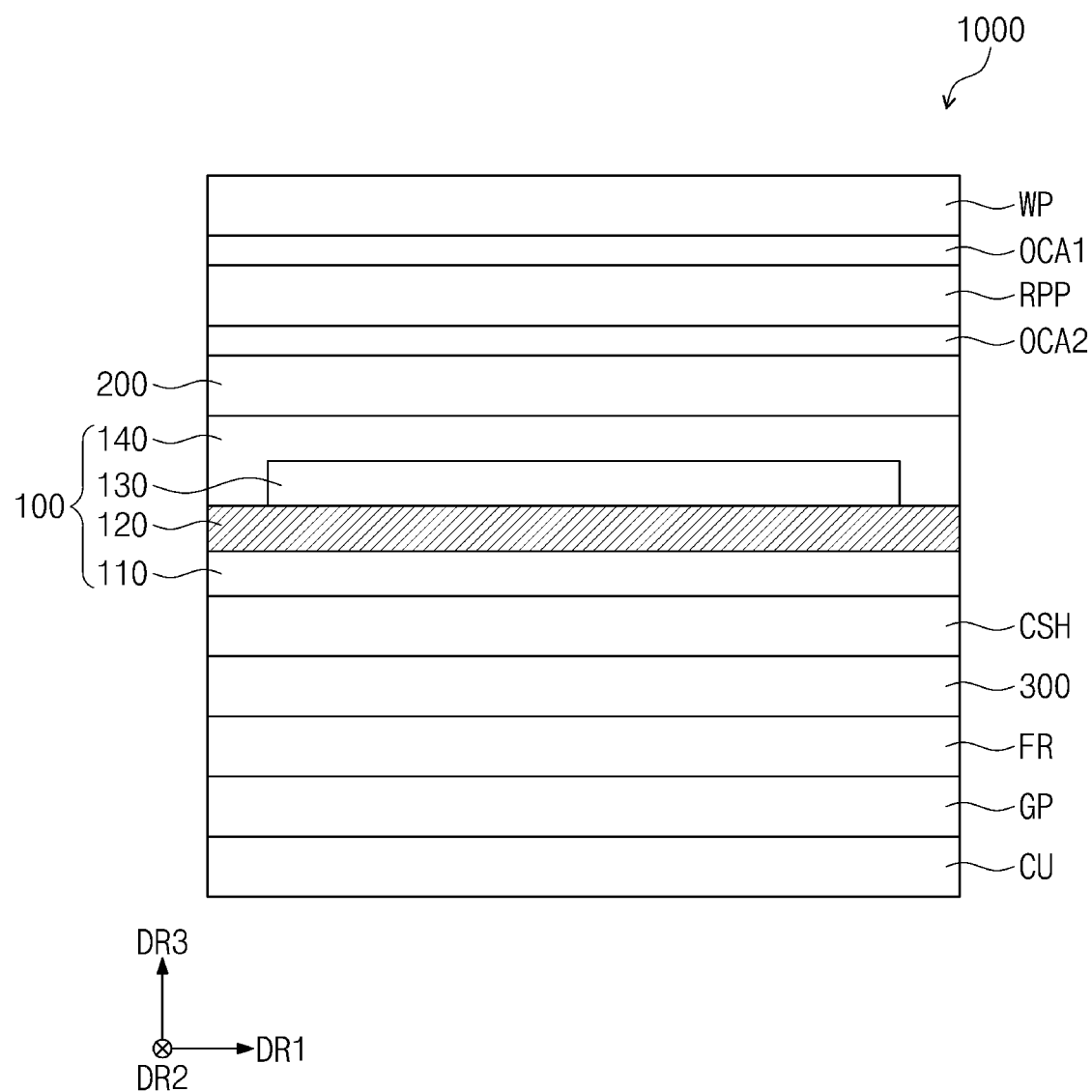
FIG. 2 is a schematic cross-sectional view illustrating an electronic device, according to an embodiment of the present disclosure.

FIG. 2 is a schematic cross-sectional view illustrating an electronic device, according to an embodiment of the present disclosure.

Referring to FIG. 2, the electronic device 1000 may include a window WP, adhesive layers OCA1 and OCA2, an anti-reflection layer RPP, a sensor layer 200, a display layer 100, a cushion layer CSH, a sensing layer 300, a signal shield layer FR, a heat radiation sheet GP, and a cover layer CU.

The window WP may constitute an appearance of the electronic device 1000. The window WP may protect internal configurations of the electronic device 1000 from external impact, and may be a configuration that substantially provides the active area 1000A of the electronic device 1000. For example, the window WP may include a glass substrate, a sapphire substrate, or a plastic film. The window WP may have a multi-layer structure or a single-layer structure. For example, the window WP may have a stacked structure of a plurality of plastic films bonded by an adhesive or may have a stacked structure of a glass substrate and a plastic film bonded by an adhesive.

The first adhesive layer OCA1 may be disposed under the window WP. The window WP and the anti-reflection layer RPP may be combined by the first adhesive layer OCA1. The first adhesive layer OCA1 may include a typical adhesive or a sticking agent. For example, the first adhesive layer OCA1 may be an optically clear adhesive film, an optically clear adhesive resin, or a pressure sensitive adhesive film.

The anti-reflection layer RPP may be disposed under the window WP. The anti-reflection layer RPP may reduce the reflectance of ambient light (e.g., sunlight) incident from above the window WP.

The anti-reflection layer RPP, according to an embodiment of the present disclosure, may include a retarder and a polarizer. The retarder may be a retarder of a film type or a liquid crystal coating type and may include a half-wave plate ($\lambda/2$) retarder and/or a quarter-wave plate ($\lambda/2$) retarder. The polarizer may be a polarizer of a film type or a liquid crystal coating type. The retarder of a film type may include a stretch-type synthetic resin film. The retarder of a liquid crystal coating type may include liquid crystals arranged in a given direction. Each of the retarder and the polarizer may further include a protective film. The retarder and polarizer themselves may be defined as a base layer of the anti-reflection layer RPP. Alternatively, the protective film may be defined as the base layer of the anti-reflection layer RPP.

The second adhesive layer OCA2 may be disposed under the anti-reflection layer RPP. The anti-reflection layer RPP and the sensor layer 200 may be coupled by the second adhesive layer OCA2. The second adhesive layer OCA2 may include substantially the same material as the first adhesive layer OCA1.

The sensor layer 200 may obtain coordinate information of an external input. The sensor layer 200, according to an embodiment of the present disclosure, may be directly disposed on one surface of the display layer 100. For example, the sensor layer 200 may be integrated with the display layer 100 in an on-cell manner. The sensor layer 200 may be manufactured by sequential processes together with the display layer 100. However, the present invention is not necessarily limited thereto. The sensor layer 200 may be manufactured by a separate process and may be adhered to the display layer 100. The sensor layer 200 may include a touch panel.

The display layer 100 may be disposed under the sensor layer 200. The display layer 100 may be a configuration that substantially generates an image. The display layer 100 may be an emission-type display layer and or another type of display layer. For example, the display layer 100 may include an organic light emitting display layer, a quantum dot display layer, a micro LED (light emitting diode) display layer, or a nano LED display layer. The display layer 100 may include a base layer 110, a circuit layer 120, a light emitting element layer 130, and an encapsulation layer 140. This will be described later.

The cushion layer CSH may be disposed under the display layer 100. The cushion layer CSH may have a function of relieving an external pressure. The cushion layer CSH may include a sponge, foam, or urethane resin.

The sensing layer 300 may be disposed under the cushion layer CSH. However, this is an example. The placement relationship of the sensing layer 300 according to an embodiment of the present disclosure is not necessarily limited thereto. For example, the sensing layer 300 may be disposed on the display layer 100. In this case, the sensing layer 300 may include a plurality of coils, each of which includes a transparent material.

The sensing layer 300 may sense an external input different from an external input detected by the sensor layer 200. For example, the sensing layer 300 may sense a signal delivered by the input device 2000 (see FIG. 1A). For example, in an embodiment, a location of a sensor may be different depending on the type of an external input. The sensing layer 300 may be driven in a manner using EMR.

The sensing layer 300 may sense a location or intensity of the input device 2000 (see FIG. 1A) applied to the active area 1000A (see FIG. 1A).

The EMR method may generate a magnetic field in a resonance circuit included in the input device 2000 (see FIG. 1A) and may detect a location of the input device 2000 (see FIG. 1A) through a signal induced in coils after the vibrating magnetic field induces the signal to the plurality of coils included in the respective sensing layer 300. The sensing layer 300 may include a digitizer.

The signal shield layer FR may be disposed under the sensing layer 300. The signal shield layer FR may prevent signal interference. The signal shield layer FR may include a magnetic material including iron oxide. For example, the signal shield layer FR may include ferrite.

The heat radiation sheet GP may be disposed under the signal shield layer FR. The heat radiation sheet GP may absorb heat, which is generated in the display layer 100 and the sensing layer 300, and emit the absorbed heat. For example, the heat radiation sheet GP may include a graphite sheet.

The cover layer CU may be disposed under the heat radiation sheet GP. The cover layer CU may have electrical conductivity. For example, the cover layer CU may include a metal such as copper Cu. For example, the cover layer CU may be a copper tape (Cu tape). However, an embodiment is not necessarily limited thereto.

Figure 3:
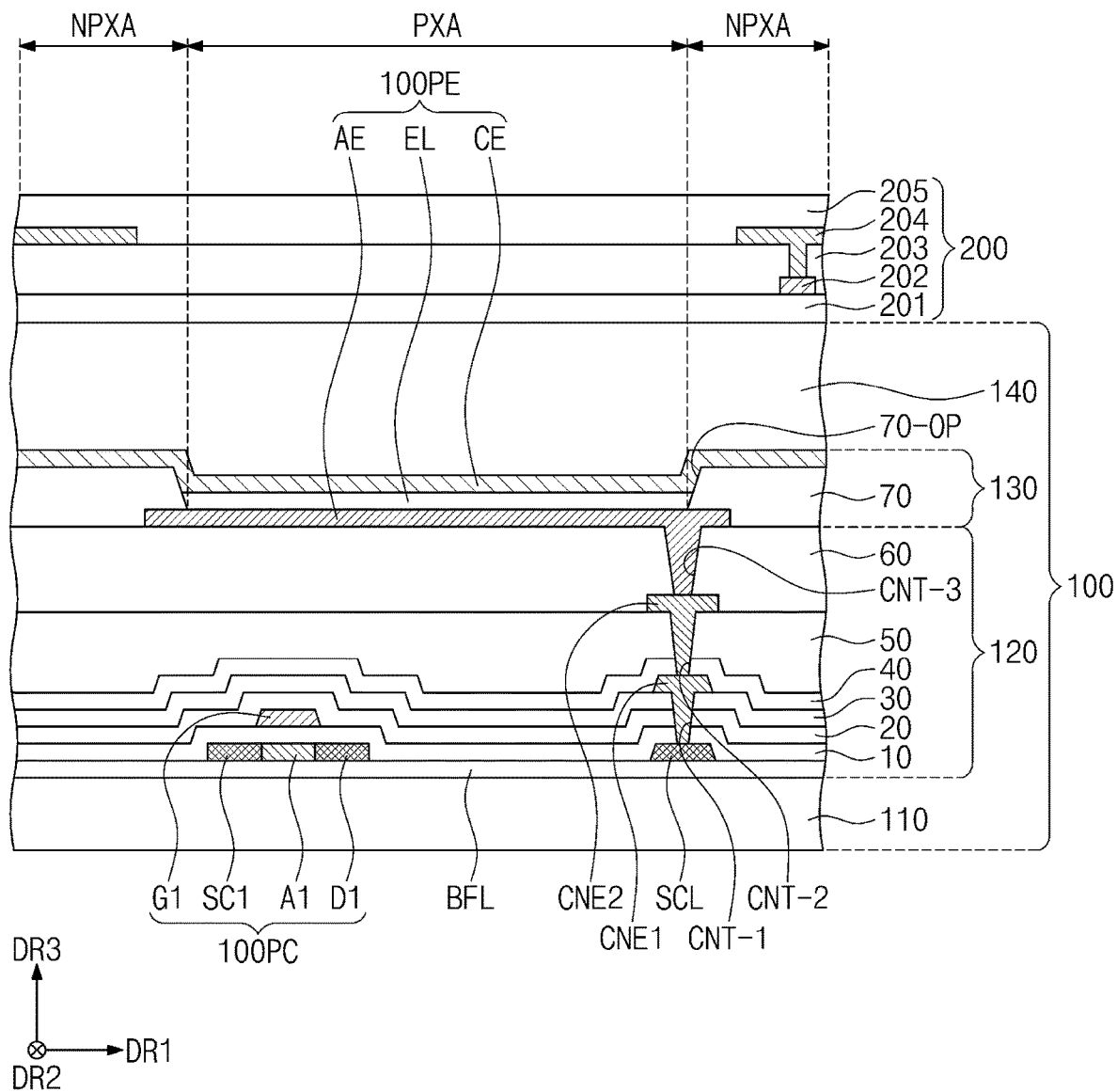
FIG. 3 is a cross-sectional view illustrating a portion of an electronic device, according to an embodiment of the present disclosure.

FIG. 3 is a cross-sectional view illustrating a portion of an electronic device, according to an embodiment of the present disclosure.

Referring to FIG. 3, the display layer 100 may include the base layer 110, the circuit layer 120, the light emitting element layer 130, and the encapsulation layer 140.

The base layer 110 may provide a base surface on which the circuit layer 120 is disposed. The base layer 110 may be a glass substrate, a metal substrate, a polymer substrate, or the like. However, an embodiment is not necessarily limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include acrylate-based resin, methacrylate-based resin, polyisoprene-based resin, vinyl-based resin, epoxy-based resin, urethane-based resin, cellulose-based resin, siloxane-based resin, polyamide-based resin, and/or perylene-based resin. As used herein, "﹏﹏"-based resin means a resin including the functional group of "﹏﹏" and so, for example, an acrylate-based resin is a resin including acrylate as a functional group.

At least one inorganic layer is formed on an upper surface of the base layer 110. The inorganic layer may include aluminum oxide, titanium oxide, silicon oxide, silicon nitride, silicon oxynitride, zirconium oxide, and/or hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may increase a bonding force between the base layer 110 and a semiconductor pattern. The buffer layer BFL may include silicon oxide, silicon nitride, and/or silicon oxynitride. For example, the buffer layer BFL may include a structure in which a silicon oxide layer and a silicon nitride layer are alternately stacked.

The semiconductor pattern may be disposed on the buffer layer BEL. The semiconductor pattern may include poly-silicon. However, an embodiment is not necessarily limited thereto, and the semiconductor pattern may include amorphous silicon, low-temperature polycrystalline silicon, or an oxide semiconductor.

FIG. 3 only illustrates a portion of the semiconductor pattern, and the semiconductor pattern may be further disposed in another area. The semiconductor patterns may be arranged across pixels in a specific rule. An electrical property of the semiconductor pattern may vary depending on whether it is doped or not. The semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped with a concentration lower than the first area.

A conductivity of the first area is greater than a conductivity of the second area. The first area may substantially serve as an electrode or a signal line. The second area may correspond to an active area of a transistor. For example, a portion of the semiconductor pattern may be an active area of a transistor, another portion thereof may be a source area or a drain area of the transistor, and another portion may be a connection electrode or a connection signal line.

Each of pixels may be expressed by an equivalent circuit including 7 transistors, one capacitor, and a light emitting element, and the equivalent circuit of the pixel may be modified in various forms. One transistor 100PC and one light emitting element 100PE included in a pixel are illustrated in FIG. 3 by way of example.

A source area SC1, an active area A1, and a drain area D1 of the transistor 100PC may be formed from the semiconductor pattern. The source area SC1 and the drain area D1 may extend in directions opposite to each other from the active area A1 in a cross-sectional view. A portion of a connection signal wire SCL forming from the semiconductor pattern is illustrated in FIG. 3. Although not separately illustrated, the connection signal wire SCL may be connected to the drain area D1 of the transistor 100PC in a plan view.

A first insulating layer 10 may be disposed on the buffer layer BFL. The first insulating layer 10 may at least partially overlap a plurality of pixels in common and may cover the semiconductor pattern. The first insulating layer 10 may bean inorganic layer and/or an organic layer and may have a single-layer or multi-layer structure. The first insulating layer 10 may include aluminum oxide, titanium oxide, silicon oxide, silicon nitride, silicon oxynitride, zirconium oxide, and/or hafnium oxide. In an embodiment, the first insulating layer 10 may be a single silicon oxide layer. Additionally, an insulating layer of the circuit layer 120 to be described later may be an inorganic layer and/or an organic layer and may have a single-layer structure or a multi-layer structure. The inorganic layer may include at least one of the above-described materials but is not necessarily limited thereto.

A gate G1 of the transistor 100PC is disposed on the first insulating layer 10. The gate G1 may be a part of a metal pattern. The gate G1 at least partially overlaps the active area A1. The gate G1 may function as a mask in a process of doping the semiconductor pattern.

A second insulating layer 20 may be disposed on the first insulating layer 10 and may cover the gate G1. The second insulating layer 20 may at least partially overlap the pixels in common. The second insulating layer 20 may be an inorganic layer and/or an organic layer and may have a single-layer or multi-layer structure. The second insulating layer 20 may include silicon oxide, silicon nitride, and/or silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal wire SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, the description will be given under the condition that the light emitting element 100PE is an organic light emitting element, but an embodiment is not necessarily particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active area 1000A (see FIG. 1A) may include a light emitting area PXA and a non-light emitting area NPXA adjacent to the light emitting area PXA. The non-light emitting area NPXA may at least partially surround the light emitting area PXA. In an embodiment, the light emitting area PXA corresponds to a partial area of the first electrode AE, which is exposed by the opening 70-OP.

The light emitting layer EL may be disposed on the first electrode AE. The light emitting layer EL may be disposed in an area defined by the opening 70-OP. For example, the light emitting layer EL may be separately formed on each of pixels. In the case where light emitting layers EL are independently formed for respective pixels, each of the light emitting layers EL may emit a light of a particular color among a blue color, a red color, and a green color. However, an embodiment is not necessarily limited thereto, and the light emitting layer EL may be connected and provided to each of the pixels in common. In this case, the light emitting layer EL may provide blue light or white light.

The second electrode CE may be disposed on the light emitting layer EL. The second electrode CE may be integrally disposed in a plurality of pixels in common.

A hole control layer may be interposed between the first electrode AE and the light emitting layer EL. The hole control layer may be disposed in common in the light emitting area PXA and the non-light emitting area NPXA. The hole control layer may include a hole transport layer and may further include a hole injection layer. An electron control layer may be interposed between the light emitting layer EL and the second electrode CE. The electron control layer may include an electron transport layer and may further include an electron injection layer. The hole control layer and the electron control layer may be formed in common in a plurality of pixels by using an open mask.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not necessarily limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include, but is not necessarily limited to including, an acrylic-based organic layer.

The sensor layer 200 may include a base layer 201, a first conductive layer 202, a sensing insulating layer 203, a second conductive layer 204, and a cover insulating layer 205.

The base layer 201 may be an inorganic layer including silicon nitride, silicon oxynitride, and/or silicon oxide. Alternatively, the base layer 201 may be an organic layer including an epoxy resin, an acrylate resin, or an imide-based resin. The base layer 201 may have a single-layer structure or may have a multi-layer structure stacked in the third direction DR3.

Each of the first conductive layer 202 and the second conductive layer 204 may have a single-layer structure or may have a multi-layer structure stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, graphene, or the like.

A conductive layer of the multi-layer structure may include metal layers. For example, the metal layers may have a three-layer structure of titanium/aluminum/titanium.

The conductive layer of the multi-layer structure may include at least one metal layer and at least one transparent conductive layer.

The sensing insulating layer 203 and/or the cover insulating layer 205 may include an inorganic film. The inorganic film may include aluminum oxide, titanium oxide, silicon oxide, silicon nitride, silicon oxynitride, zirconium oxide, and/or hafnium oxide.

The sensing insulating layer 203 and/or the cover insulating layer 205 may include an organic film. The organic film may include acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and/or perylene-based resin.

Figure 4:
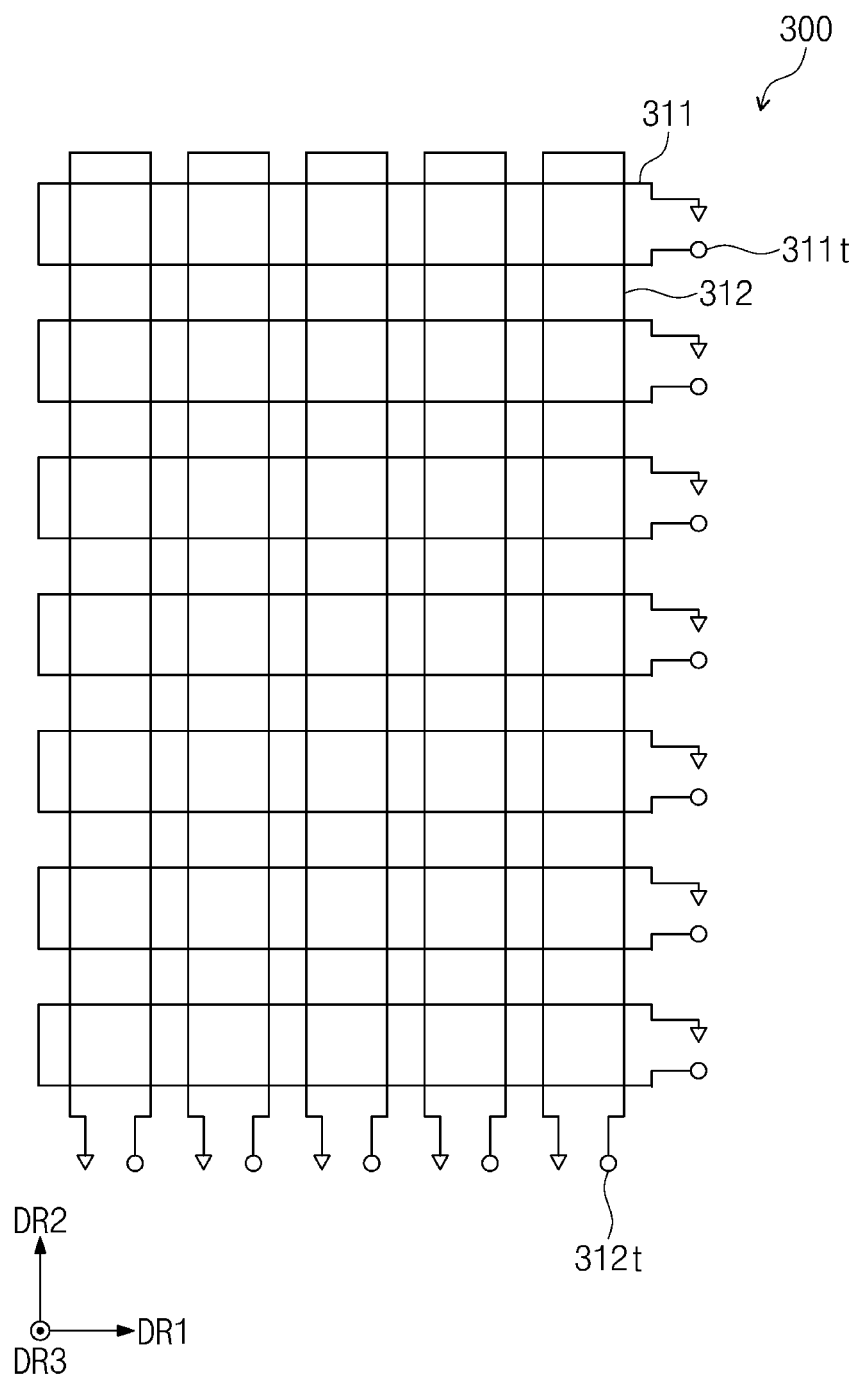
FIG. 4 is a plan view schematically illustrating a configuration of a sensing layer, according to an embodiment of the present disclosure.

FIG. 4 is a plan view schematically illustrating a configuration of a sensing layer, according to an embodiment of the present disclosure.

Referring to FIG. 4, the sensing layer 300 may include a plurality of first coils 311 and a plurality of second coils 312. The plurality of first coils 311 may be referred to as "drive coils". The plurality of second coils 312 may be referred to as "sensing coils".

Each of the plurality of first coils 311 may extend in the first direction DR1. The plurality of first coils 311 may be spaced from each other in the second direction DR2. Each of the plurality of second coils 312 may extend primarily in the second direction DR2. The plurality of second coils 312 may be spaced from each other in the first direction DR1.

An alternating current (AC) signal may be sequentially provided to a first terminals 311$t$ of the plurality of first coils 311 to detect the input device 2000 (see FIG. 1A). The plurality of first coils 311 may be formed in a closed curve shape. When a current flows into the plurality of first coils 311, magnetic field lines may be induced between the plurality of first coils 311 and the plurality of second coils 312. The plurality of second coils 312 may output a signal for detecting induced electromagnetic force emitted from the input device 2000 (see FIG. 1A) to a second terminals 312$t$ of the plurality of second coils 312.

FIG. 4 illustrates a configuration of the sensing layer 300, but the present invention is not necessarily limited thereto. Moreover, the arrangement relationship of the plurality of first coils 311 and the plurality of second coils 312 is not necessarily limited to that shown in FIG. 4 and may be modified in various manners.

Figure 5:
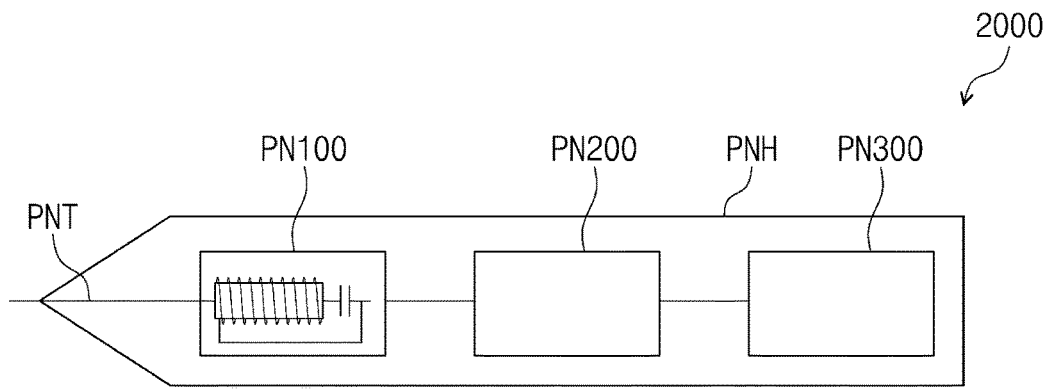
FIG. 5 is a block diagram illustrating an input device, according to an embodiment of the present disclosure.

FIG. 5 is a block diagram illustrating an input device, according to an embodiment of the present disclosure.

Referring to FIG. 5, the input device 2000 may include a housing PNH, a pen tip PNT, a resonance circuit unit PN100, a control unit PN200, and a power supply unit PN300.

The housing PNH may have a pen shape. An accommodation space may be formed inside the housing PNH. The resonance circuit unit PN100, the control unit PN200, and the power supply unit PN300 may be accommodated within the accommodation space defined inside the housing PNH.

The pen tip PNT may be positioned at an end of the housing PNH. For example, a portion of the pen tip PNT may be exposed to the outside of the housing PNH. The remaining portions of the pen tip PNT may be inserted into the housing PNH.

The resonance circuit unit PN100 may be configured to generate a signal (or a detection signal, a Tx signal, or a transmission signal). The resonance circuit unit PN100 may include an integrated circuit or oscillator, which is designed to perform a specific function. For example, the resonance circuit unit PN100 may output an AC signal of a frequency having a predetermined value.

A first induced current may be generated by a first driving signal S1 (see FIG. 8) from the electronic device 1000 in the resonance circuit unit PN100. The resonance circuit unit PN100 may resonate by the first induced current, and thus a first magnetic field may be generated.

The control unit PN200 may control the resonance circuit unit PN100. The control unit PN200 may generate a second driving signal S2 (see FIG. 8) based on the power of the power supply unit PN300.

A second induced current may be generated by a second driving signal S2 (see FIG. 8) from the control unit PN200 in the resonance circuit unit PN100. The resonance circuit unit PN100 may resonate by the second induced current, and thus a second magnetic field may be generated. The sensing layer 300 (see FIG. 2) may sense an input generated by the input device 2000 based on the second magnetic field.

The power supply unit PN300 may supply power to the control unit PN200. The power supply unit PN300 may include a battery or a high-capacity capacitor.

Figure 6:
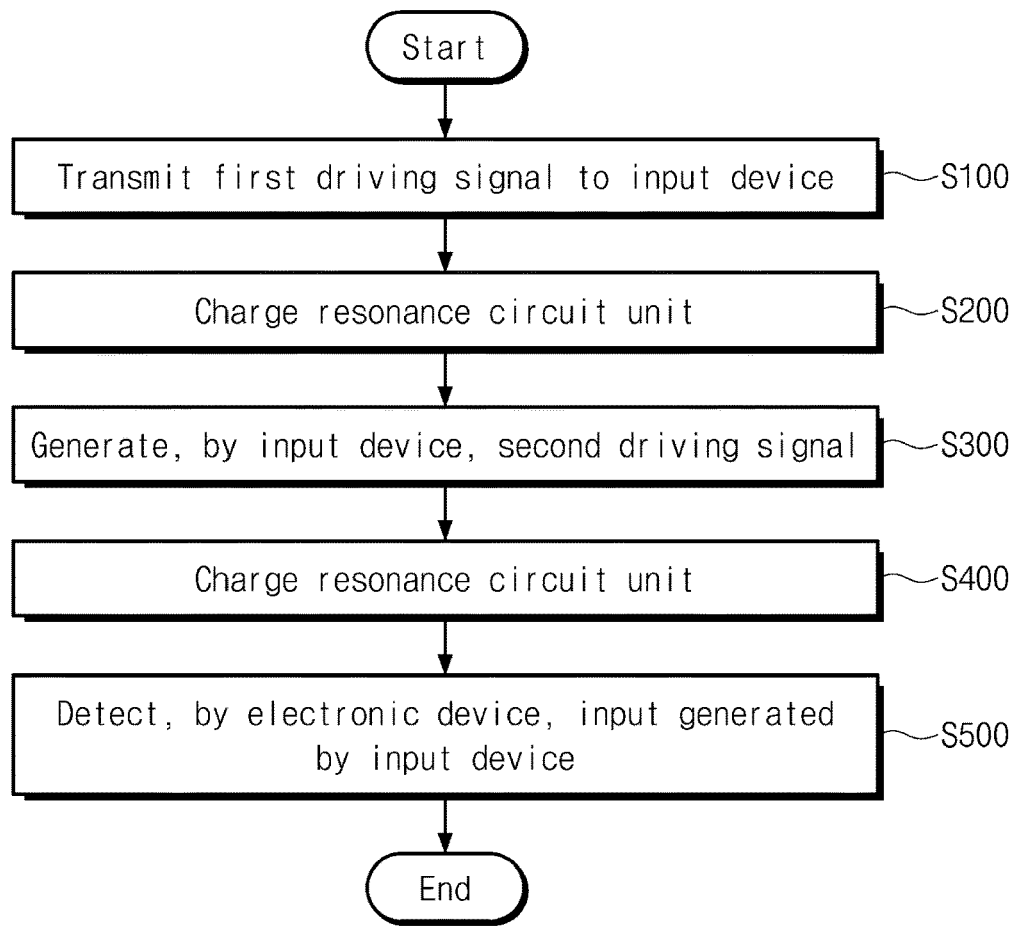
FIG. 6 is a flowchart illustrating a method of driving an interface device, according to an embodiment of the present disclosure.
Figure 7:
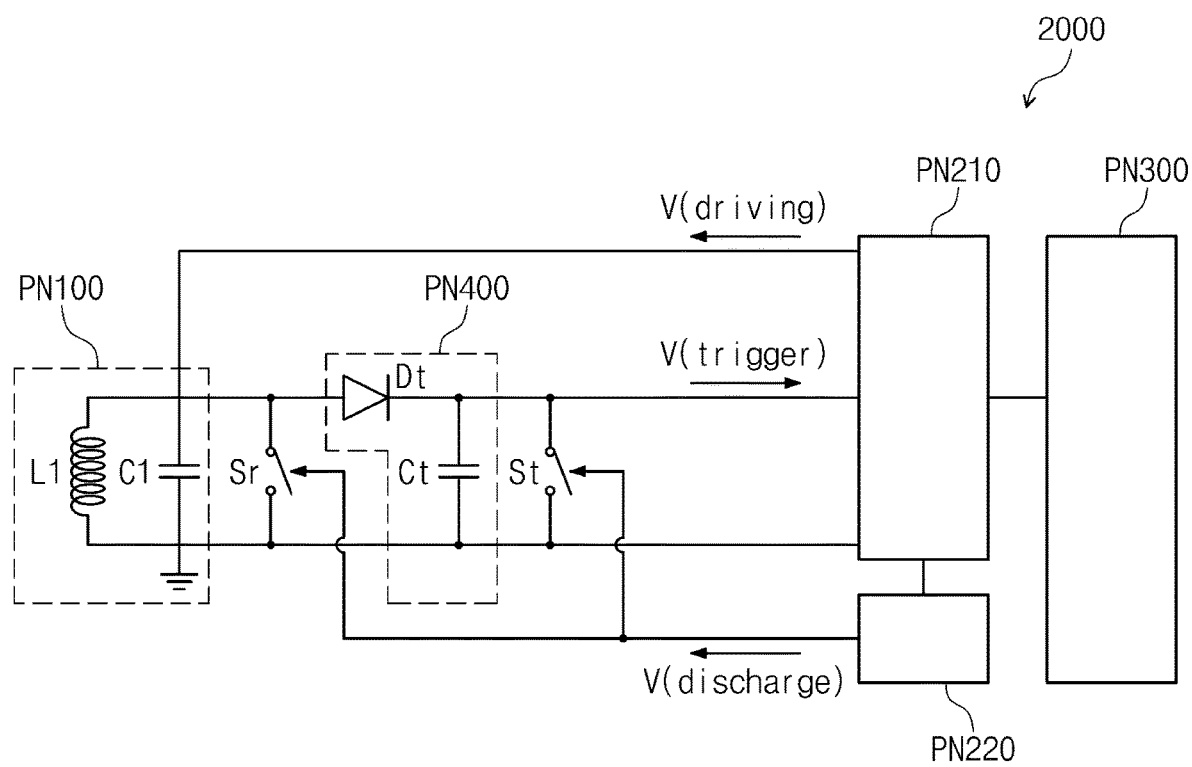
FIG. 7 is a schematic diagram illustrating an input device, according to an embodiment of the present disclosure.
Figure 8:
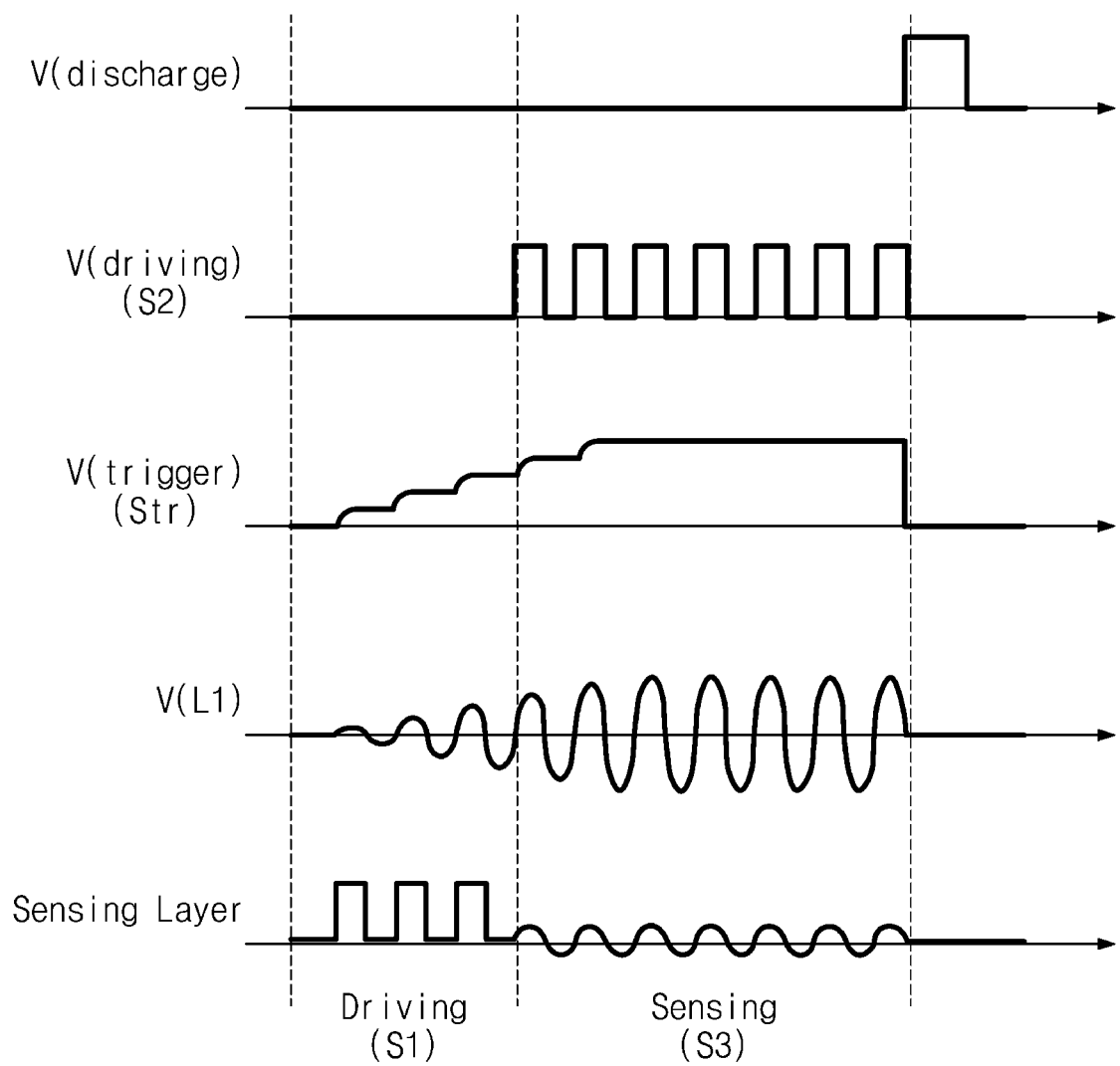
FIG. 8 is a timing diagram illustrating a signal, according to an embodiment of the present disclosure.

FIG. 6 is a flowchart illustrating a method of driving an interface device, according to an embodiment of the present disclosure. FIG. 7 illustrates an input device, according to an embodiment of the present disclosure. FIG. 8 illustrates a signal, according to an embodiment of the present disclosure. In the description of FIGS. 6 to 8, the same reference numerals may be assigned to the same components described with reference to FIG. 5, and thus to the extent that a detailed description of one or elements has been omitted, it may be understood that those elements are at least similar to corresponding elements described elsewhere within the specification.

Referring to FIGS. 6 to 8, the resonance circuit unit PN100 may include a first capacitor C1 and a first inductor L1. The first capacitor C1 may store a current flow by the first driving signal S1 or the second driving signal S2 as an electric field. The first inductor L1 may be electrically connected to the first capacitor C1. The first inductor L1 may be connected in parallel with the first capacitor C1. The first inductor L1 may store the current flow by the first driving signal S1 or the second driving signal S2 as a magnetic field.

The sensing layer 300 (see FIG. 2) of the electronic device 1000 (see FIG. 1A) may transmit the first driving signal S1 to the input device 2000 (S100).

The resonance circuit unit PN100 may be charged by the first driving signal S1 (S200). The resonance circuit unit PN100 may generate a first magnetic field based on the first driving signal SL.

According to comparative examples, when the resonance circuit unit PN100 does not provide a step of charging by the first driving signal S1, the input device may include a separate communication unit. The communication unit may exchange a signal for synchronization with the sensing layer 300 (see FIG. 2) or the sensor layer 200 (see FIG. 2). The electronic device and the input device may require a communication time for synchronization. However, according to an embodiment of the present disclosure, the resonance circuit unit PN100 may be charged by the first driving signal S1 of the sensing layer 300 (see FIG. 2). The input device 2000 may communicate with the electronic device 1000 (see FIG. 1A) based on the charged resonance circuit unit PN100. The electronic device 1000 (see FIG. 1A) and the input device 2000 might not require a communication time for synchronization. For example, the communication time between the electronic device 1000 (see FIG. 1A) and the input device 2000 may be reduced. The interface device 10000 (see FIG. 1A) may have a high report rate. Accordingly, the interface device 10000 (see FIG. 1A) may secure a sufficient report rate.

The input device 2000 may further include a rectifier circuit PN400. The rectifier circuit PN400 may include a rectifier diode Dt and a rectifier capacitor Ct. The rectifier diode Dt may rectify the voltage boosted by the resonance of the resonance circuit unit PN100. The rectified voltage may be accumulated in the rectifier capacitor Ct. The accumulated voltage may be referred to as a trigger signal Str. For example, the level of the trigger signal Str may be changed based on charging of the resonance circuit unit PN100.

As the resonance circuit unit PN100 is charged, the potential of the trigger signal Str may increase. When the trigger signal Str reaches a predetermined level, the control unit PN200 may operate.

The control unit PN200 (see FIG. 5) may include a driving control unit PN210 and a discharge control unit PN220.

The driving control unit PN210 may generate the second driving signal S2 based on a power supply (S300). The driving control unit PN210 may transmit the second driving signal S2 to the resonance circuit unit PN100.

The resonance circuit unit PN100 may be charged by the second driving signal S2 (S400). The resonance circuit unit PN100 may generate a second magnetic field based on the second driving signal S2.

The electronic device 1000 (see FIG. 1A) may detect an input S3 generated by the input device 2000 based on the second driving signal S2 for charging the resonance circuit unit PN100 (S500).

According to a comparative example, when a step at which the resonance circuit unit PN100 is charged by the second driving signal S2 is not provided, a time required to charge the resonance circuit unit PN100 by the first driving signal S1 may increase for the resonance circuit unit PN100 to be sufficiently charged. The sensing layer 300 (see FIG. 2) may continuously provide the first driving signal S1, and power consumption of the electronic device 1000 (see FIG. 1A) may increase. However, according to an embodiment of the present disclosure, when the trigger signal Str of the input device 2000 reaches a predetermined level, the driving control unit PN210 may generate the second driving signal S2 based on the power source. For example, even though the resonance circuit unit PN100 is not sufficiently charged by the first driving signal S1, the resonance circuit unit PN100 may be charged through the second driving signal S2. A time required to provide the first driving signal S1 of the sensing layer 300 (see FIG. 2) may be reduced. The interface device 10000 (see FIG. 1A) may have a high report rate. Accordingly, the interface device 10000 (see FIG. 1A) may secure a sufficient report rate. Also, the power consumption of the electronic device 1000 (see FIG. 1A) may be reduced.

According to a comparative example, when the electronic device (1000, see FIG. 1A) detects an input generated by the input device based on the capacity charged in the resonance circuit unit PN100, the charged capacity may be consumed as the sensing time goes by, and thus the output of the input generated by the input device 2000 may be reduced. In addition, the sensitivity of the electronic device to the input device may be reduced. However, according to an embodiment of the present disclosure, the resonance circuit unit PN100 may be charged by the second driving signal S2. The second driving signal S2 may be generated based on a power supply provided from the power supply unit PN300. As the power supply is provided, the output of the input generated by the input device 2000 may be maintained uniformly. Accordingly, the sensitivity of the electronic device 1000 (see FIG. 1A) to the input device 2000 may be increased.

The discharge control unit PN220 may discharge the trigger signal Str. The driving control unit PN210 may terminate generation of the second driving signal S2 based on the discharged trigger signal Str. The discharge control unit PN220 may control a first discharge switch St such that the trigger signal Str is discharged.

The discharge control unit PN220 may discharge the resonance circuit unit PN100. Under control of the discharge control unit PN220, the resonance circuit unit PN100 may wait for charging by the first driving signal S1. The discharge control unit PN220 may control a second discharge switch Sr such that the resonance circuit unit PN100 is discharged.

The discharge control unit PN220 may prepare to receive the next first driving signal S1 of the sensing layer 300 (see FIG. 2) by discharging the trigger signal Str and the resonance circuit unit PN100.

Figure 9:
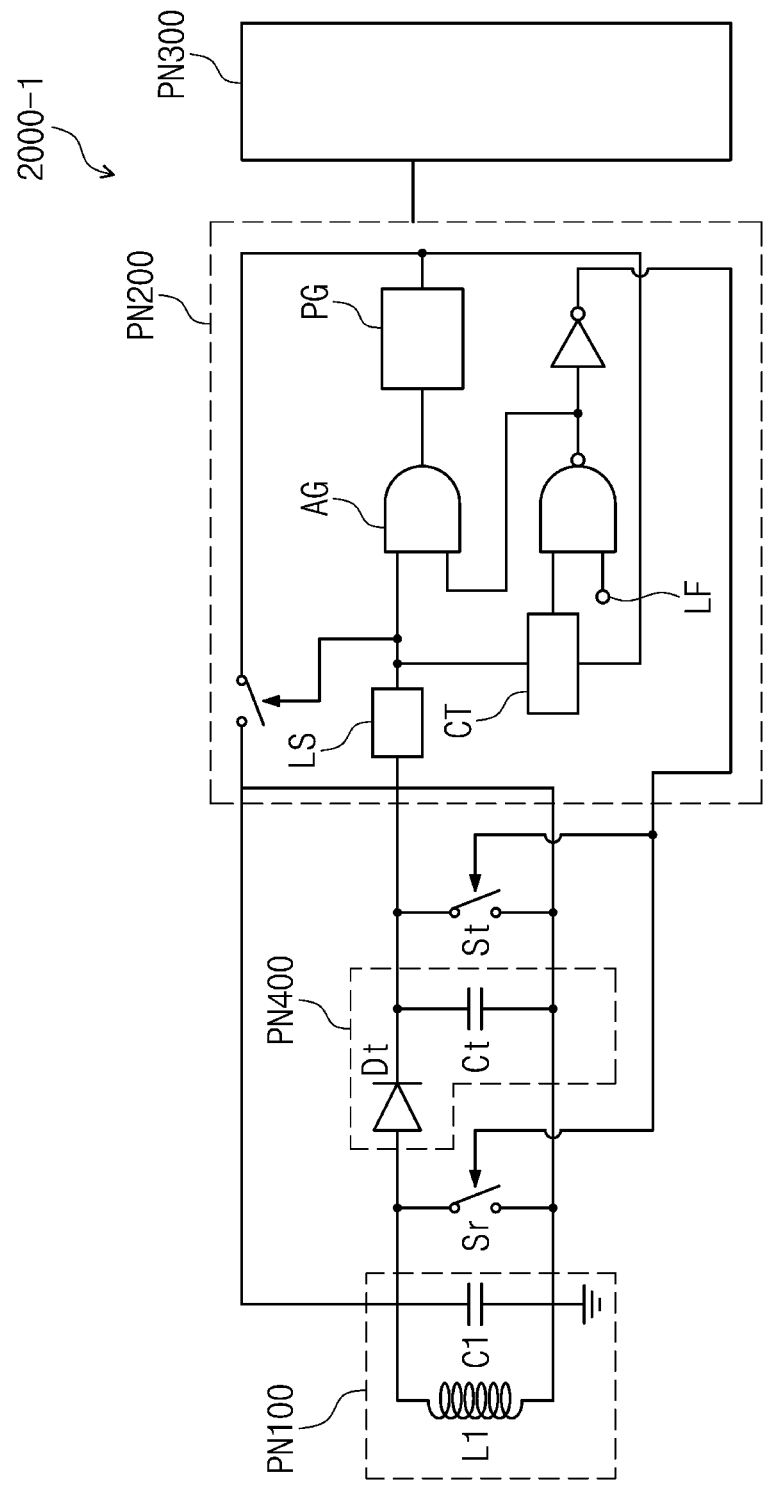
FIG. 9 is a schematic diagram illustrating an input device, according to an embodiment of the present disclosure.
Figure 10:
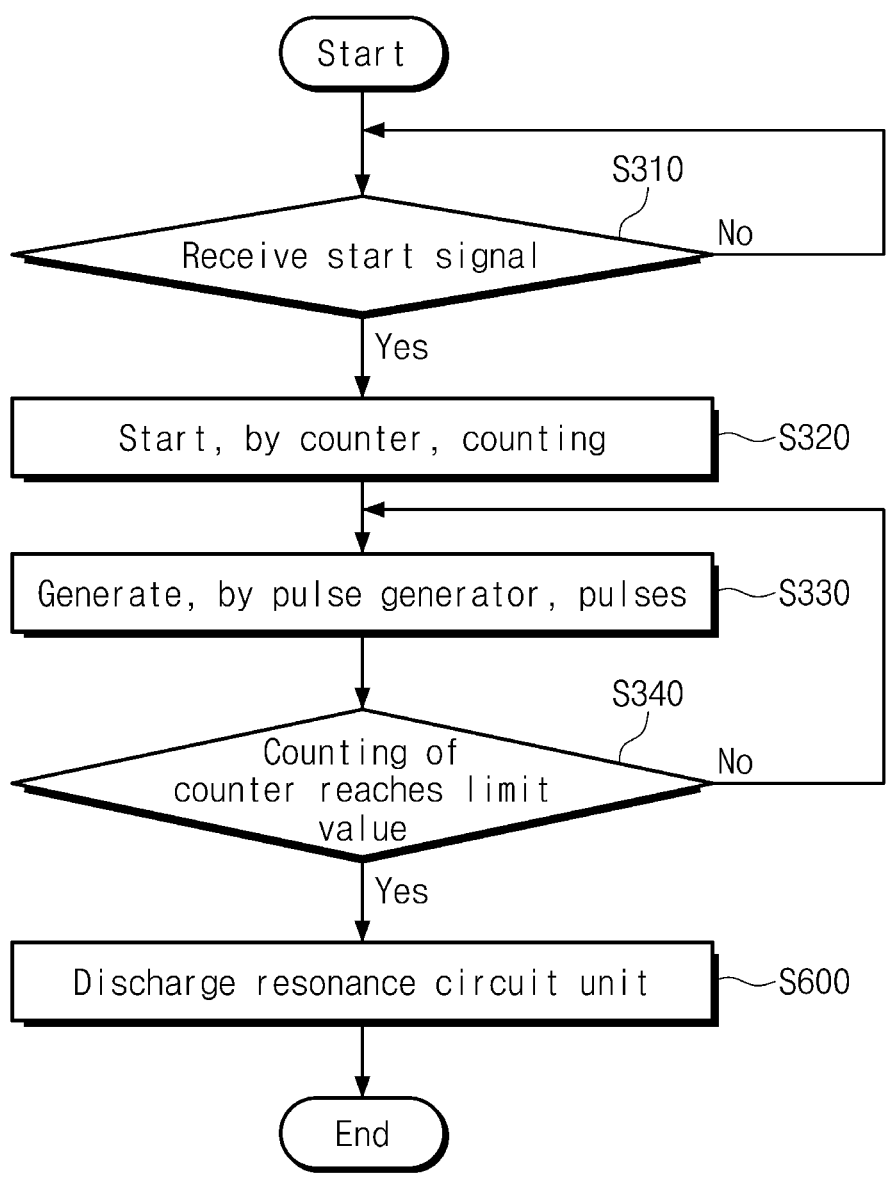
FIG. 10 is a flowchart illustrating an operation of a control unit, according to an embodiment of the present disclosure.

FIG. 9 illustrates an input device, according to an embodiment of the present disclosure. FIG. 10 is a flowchart illustrating an operation of a control unit, according to an embodiment of the present disclosure. In the description of FIG. 9, the same reference numerals may be assigned to the same components described with reference to FIG. 7, and thus to the extent that a detailed description of one or elements has been omitted, it may be understood that those elements are at least similar to corresponding elements described elsewhere within the disclosure.

Referring to FIGS. 9 and 10, an input device 2000-1 may include the resonance circuit unit PN100, the control unit PN200, the power supply unit PN300, and the rectifier circuit PN400. The control unit PN200 may include a level shifter LS, a counter CT, a pulse generator PG, and a logic element AG.

The level shifter LS may receive a start signal (S310). The level shifter LS may be electrically connected to the resonance circuit unit PN100. The level shifter LS may convert an input signal from the resonance circuit unit PN100 into a signal having a voltage level capable of being processed by the control unit PN200.

The counter CT may be connected to the level shifter LS. When the start signal is received, the counter CT may start counting (S320).

The pulse generator PG may be connected to the counter CT and the level shifter LS. The pulse generator PG may generate a plurality of pulses (S330). The plurality of pulses may constitute the second driving signal S2 (see FIG. 8).

The logic element AG may connect the level shifter LS, the counter CT, and the pulse generator PG. The logic element AG may include an AND gate, a NAND gate, and a NOT gate.

For example, the output of the level shifter LS and the output of the NAND gate may be input to the AND gate, and the output of the AND gate may be connected to the pulse generator PG. The output of the counter CT and a limit value LF may be input to the NAND gate, and then the output of the NAND gate may be connected to the input terminal of the NOT gate.

The level shifter LS, the counter CT, the pulse generator PG, the AND gate, and the NAND gate may constitute the driving control unit PN210. The counter CT, the NAND gate, and the NOT gate may constitute the discharge control unit PN220.

When the counting of the counter CT reaches the limit value LF, the counting may be stopped (S340). When the counting is stopped, the pulse generator PG may stop generating pulses. For example, the second driving signal S2 (see FIG. 8) may be terminated.

When the counting is stopped, the control unit PN200 may discharge the resonance circuit unit PN100 (S600).

Figure 11:
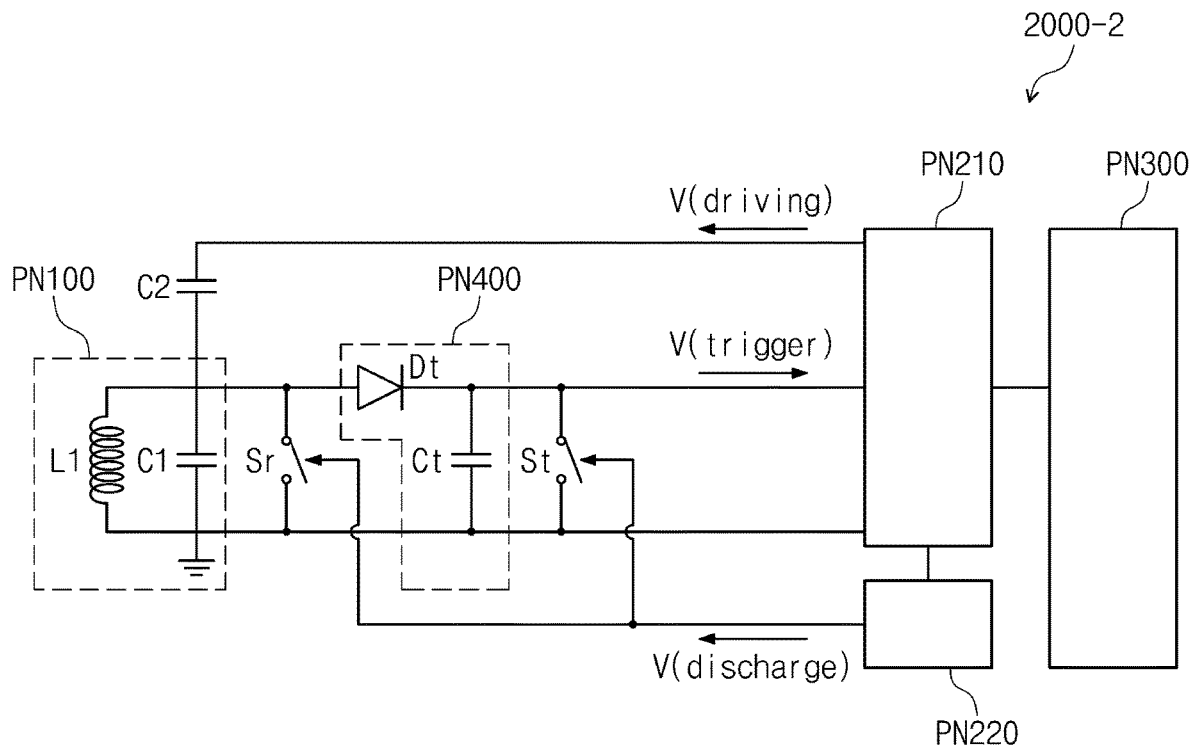
FIG. 11 is a schematic diagram illustrating an input device, according to an embodiment of the present disclosure.

FIG. 11 illustrates an input device, according to an embodiment of the present disclosure. In the description of FIG. 11, the same reference numerals may be assigned to the same components described with reference to FIG. 7, and thus to the extent that a detailed description of one or elements has been omitted, it may be understood that those elements are at least similar to corresponding elements described elsewhere within the specification.

Referring to FIGS. 8 and 11, an input device 2000-2 may include the resonance circuit unit PN100, the driving control unit PN210, the discharge control unit PN220, the power supply unit PN300, the rectifier circuit PN400, and a second capacitor C2.

The second capacitor C2 may be electrically connected between the resonance circuit unit PN100 and the driving control unit PN210. For example, the second capacitor C2 may be connected in series between the resonance circuit unit PN100 and the driving control unit PN210.

According to an embodiment of the present disclosure, a voltage generated by the second magnetic field in the resonance circuit unit PN100 and the second capacitor C2 may be boosted by the second capacitor C2 to be higher than the voltage of the second driving signal S2. The sensing sensitivity of the electronic device 1000 (see FIG. 1A) to the input S3 of an input device 2000-2 may be increased. Accordingly, the interface device 10000 (see FIG. 1A) having increased reliability may be provided.

When the resonance circuit unit PN100 is charged by the first driving signal S1, the resonance circuit unit PN100 may resonate at a first frequency. For example, the first frequency may satisfy Equation 1.

$$\tfrac{1}{2}\pi\sqrt{L1\times C1} \qquad [\text{Equation 1}]$$

When the resonance circuit unit PN100 is charged by the second driving signal S2, the resonance circuit unit PN100 and the second capacitor C2 may resonate at a second frequency different from the first frequency. The second frequency may be lower than the first frequency. For example, the second frequency may satisfy Equation 2.

$$\tfrac{1}{2}\pi\sqrt{L1\times (C1+C2)} \qquad [\text{Equation 2}]$$

Figure 12:
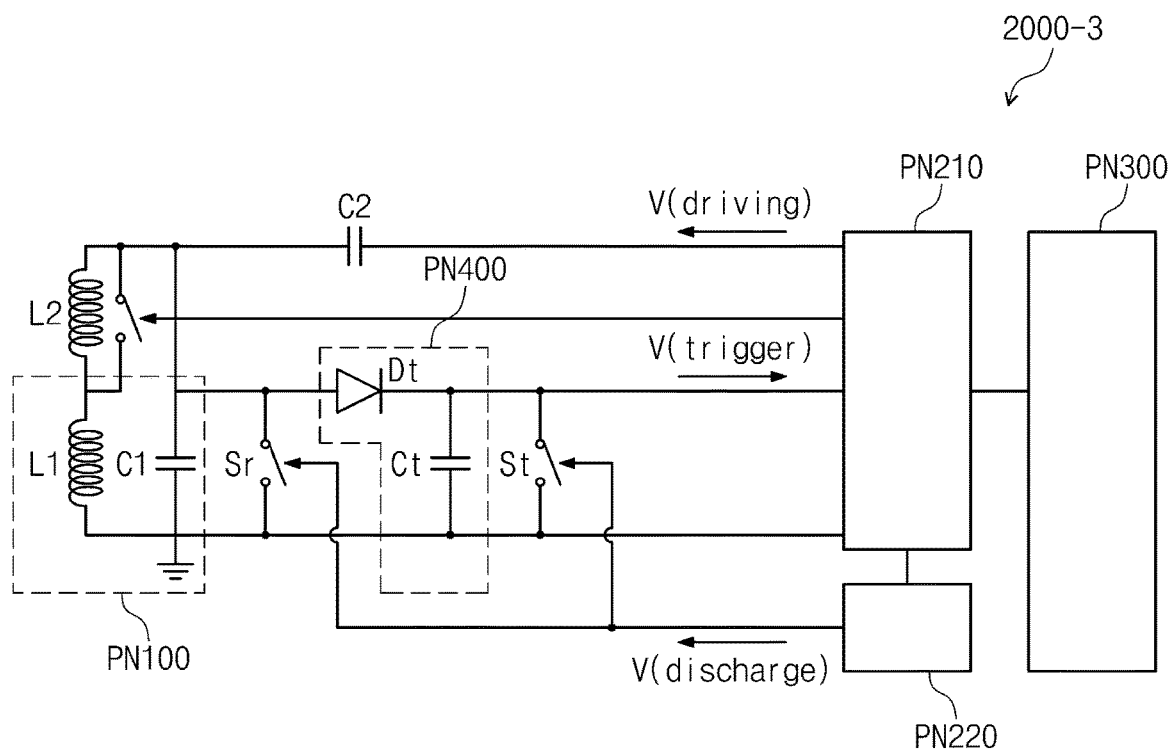
FIG. 12 is a schematic diagram illustrating an input device, according to an embodiment of the present disclosure.

FIG. 12 illustrates an input device, according to an embodiment of the present disclosure. In the description of FIG. 12, the same reference numerals may be assigned to the same components described with reference to FIG. 11, and thus to the extent that a detailed description of one or elements has been omitted, it may be understood that those elements are at least similar to corresponding elements described elsewhere within the specification.

Referring to FIGS. 8 and 12, an input device 2000-3 may include the resonance circuit unit PN100, the driving control unit PN210, the discharge control unit PN220, the power supply unit PN300, the rectifier circuit PN400, the second capacitor C2, and a second inductor L2.

The second inductor L2 may be electrically connected between the resonance circuit unit PN100 and the driving control unit PN210. For example, the second inductor L2 may be connected in series with the first inductor L1.

According to an embodiment of the present disclosure, a voltage generated by the second magnetic field in the resonance circuit unit PN100 and the second capacitor C2 may be boosted by the second capacitor C2 to be higher than the voltage of the second driving signal S2. The sensing sensitivity of the electronic device 1000 (see FIG. 1A) to the input S3 of an input device 2000-3 may be increased. Accordingly, the interface device 10000 (see FIG. 1A) having increased reliability may be provided.

When the first driving signal S1 is provided from the sensing layer 300 (see FIG. 2), the second inductor L2 may be electrically connected to the resonance circuit unit PN100. When the resonance circuit unit PN100 is charged by the first driving signal S1, the resonance circuit unit PN100 and the second inductor L2 may resonate at a third frequency. For example, the third frequency may satisfy Equation 3.

$$\tfrac{1}{2}\pi\sqrt{(L1+L2)\times C1} \qquad [\text{Equation 3}]$$

When the second driving signal S2 is provided from the driving control unit PN210, the second inductor L2 may be electrically isolated from the resonance circuit unit PN100. For example, when the second driving signal S2 is provided from the driving control unit PN210, the switch connected in parallel with the second inductor L2 may be turned on, and then may control the resonance circuit unit PN100 and the second inductor L2 not to be electrically connected.

When the resonance circuit unit PN100 is charged by the second driving signal S2, the resonance circuit unit PN100 and the second capacitor C2 may resonate at a fourth frequency. For example, the fourth frequency may satisfy Equation 4.

$$\tfrac{1}{2}\pi\sqrt{L1\times (C1+C2)} \qquad [\text{Equation 4}]$$

The third frequency and the fourth frequency may have the same value as each other. For example, a value of each of the second inductor L2 and the second capacitor C2 may be defined such that values of ((L1+L2)*C1) and (L1*(C1+C2)) are the same as each other.

Figure 13:
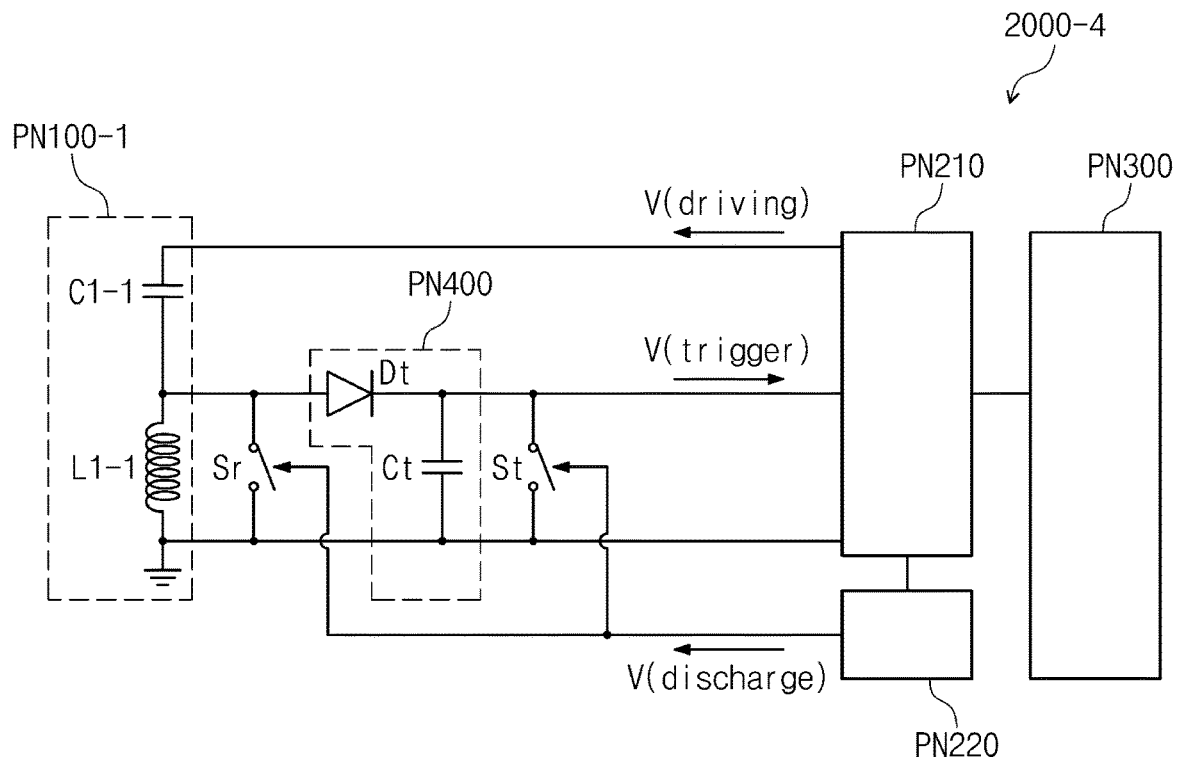
FIG. 13 is a schematic diagram illustrating an input device, according to an embodiment of the present disclosure.

FIG. 13 illustrates an input device, according to an embodiment of the present disclosure. In the description of FIG. 13, the same reference numerals may be assigned to the same components described with reference to FIG. 7, and thus to the extent that a detailed description of one or elements has been omitted, it may be understood that those elements are at least similar to corresponding elements described elsewhere within the specification.

Referring to FIGS. 8 and 13, an input device 2000-4 may include a resonance circuit unit PN100-1, the driving control unit PN210, the discharge control unit PN220, the power supply unit PN300, and the rectifier circuit PN400.

The resonance circuit unit PN100-1 may include a first capacitor C1-1 and a first inductor 1-1. The first capacitor C1-1 may store a current flow by the first driving signal S1 or the second driving signal S2 as an electric field. The first inductor L1-1 may be electrically connected to the first capacitor C1-1. The first capacitor C1-1 may be connected in series between the driving control unit PN210 and the first inductor L1-1. The first inductor L1-1 may store the current flow by the first driving signal S1 or the second driving signal S2 as a magnetic field.

When the pulse generator PG (see FIG. 9) stops generating pulses, the output of the pulse generator PG (see FIG. 9) may be connected to a ground electrode.

The resonant frequency in the case where the resonance circuit unit PN100 is charged by the first driving signal S1 may be the same as the resonant frequency in the case where the resonance circuit unit PN100 is charged by the second driving signal S2.

Figure 14:
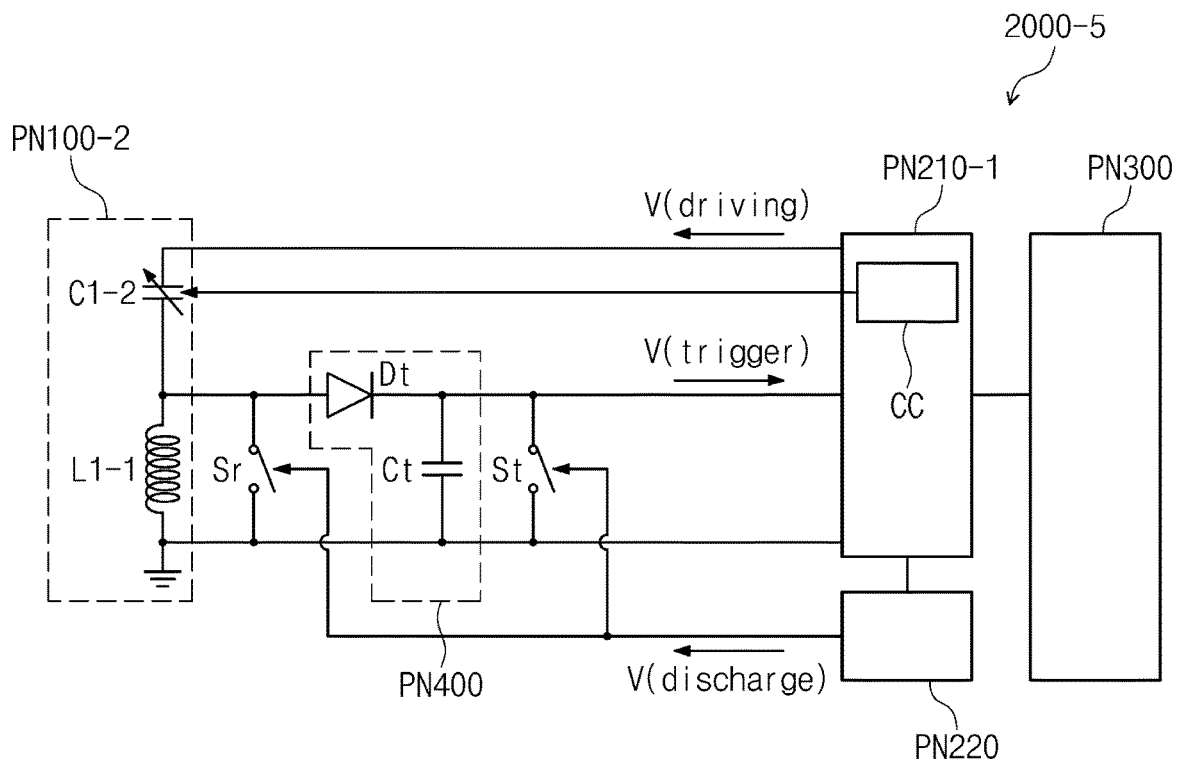
FIG. 14 is a schematic diagram illustrating an input device, according to an embodiment of the present disclosure.

FIG. 14 illustrates an input device, according to an embodiment of the present disclosure. In the description of FIG. 14, the same reference numerals may be assigned to the same components described with reference to FIG. 13, and thus to the extent that a detailed description of one or elements has been omitted, it may be understood that those elements are at least similar to corresponding elements described elsewhere within the specification.

Referring to FIGS. 8 and 14, an input device 2000-5 may include a resonance circuit unit PN100-2, a driving control unit PN210-1, the discharge control unit PN220, the power supply unit PN300, and the rectifier circuit PN400.

The resonance circuit unit PN100-2 may include a first capacitor C1-2 and the first inductor L1-1. The first capacitor C1-2 may be a variable capacitor.

The driving control unit PN210-1 may further include a capacitance control unit CC. The capacitance control unit CC may adjust the capacitance of the first capacitor C1-2.

The resonance frequency of the input S3 generated by the input device 2000-5 may be varied by the capacitance control unit CC. The electronic device 1000 (see FIG. 1A) may extract information from the input S3 based on the changed resonance frequency.

For example, the input device 2000-5 may further include a button. The information may include information about manipulation of the button. The button may be manipulated by a user employing the input device 2000-5. A mode of the input device 2000-5 may be switched to a pen input mode, a right-click mode, or an eraser mode based on the information.

Alternatively, the information may include information about pen pressure. The capacitance control unit CC may change the resonance frequency by detecting the pressure applied to the pen tip PNT (see FIG. 4).

Figure 15A:
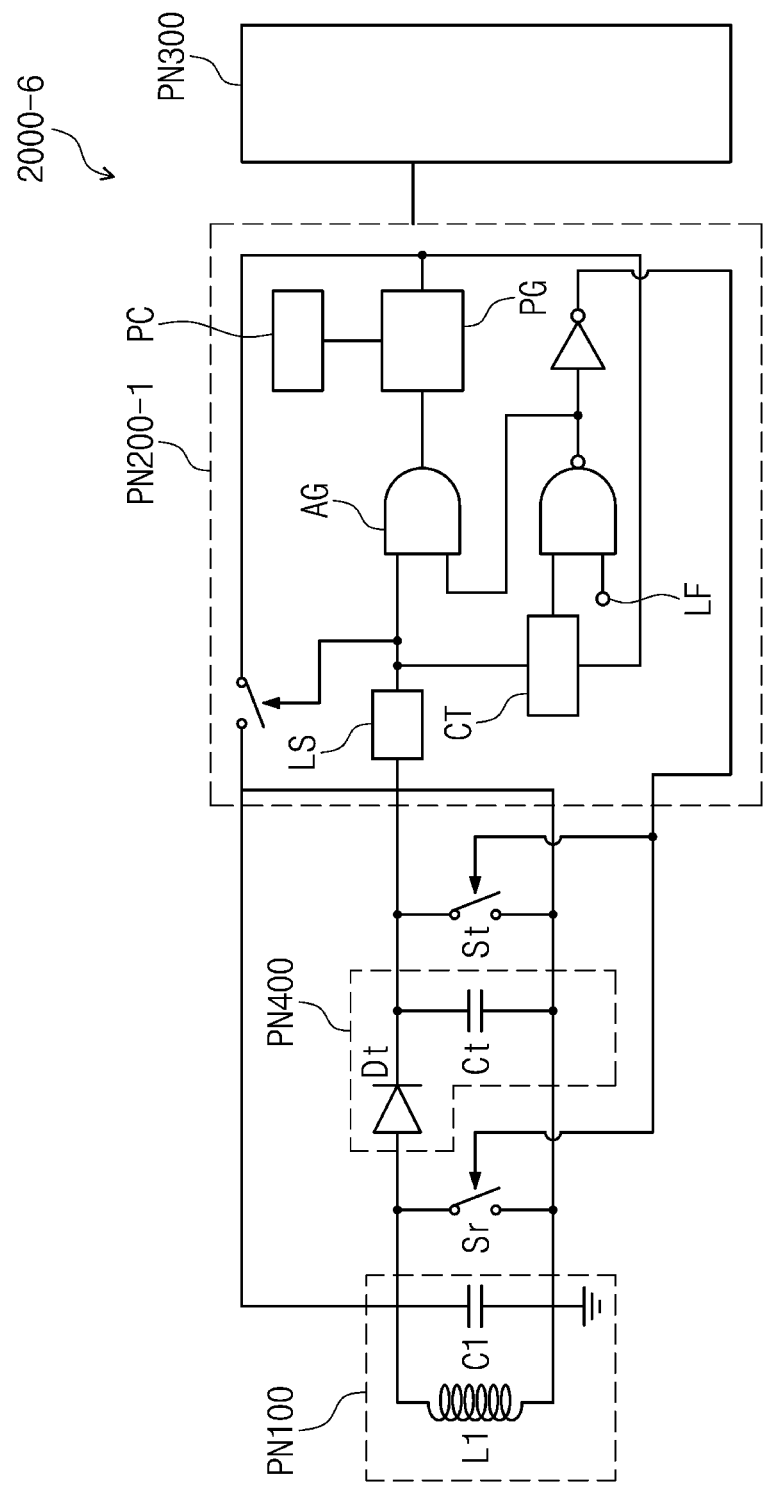
FIGS. 15A and 15B are views illustrating an input device, according to an embodiment of the present disclosure.
Figure 15B:
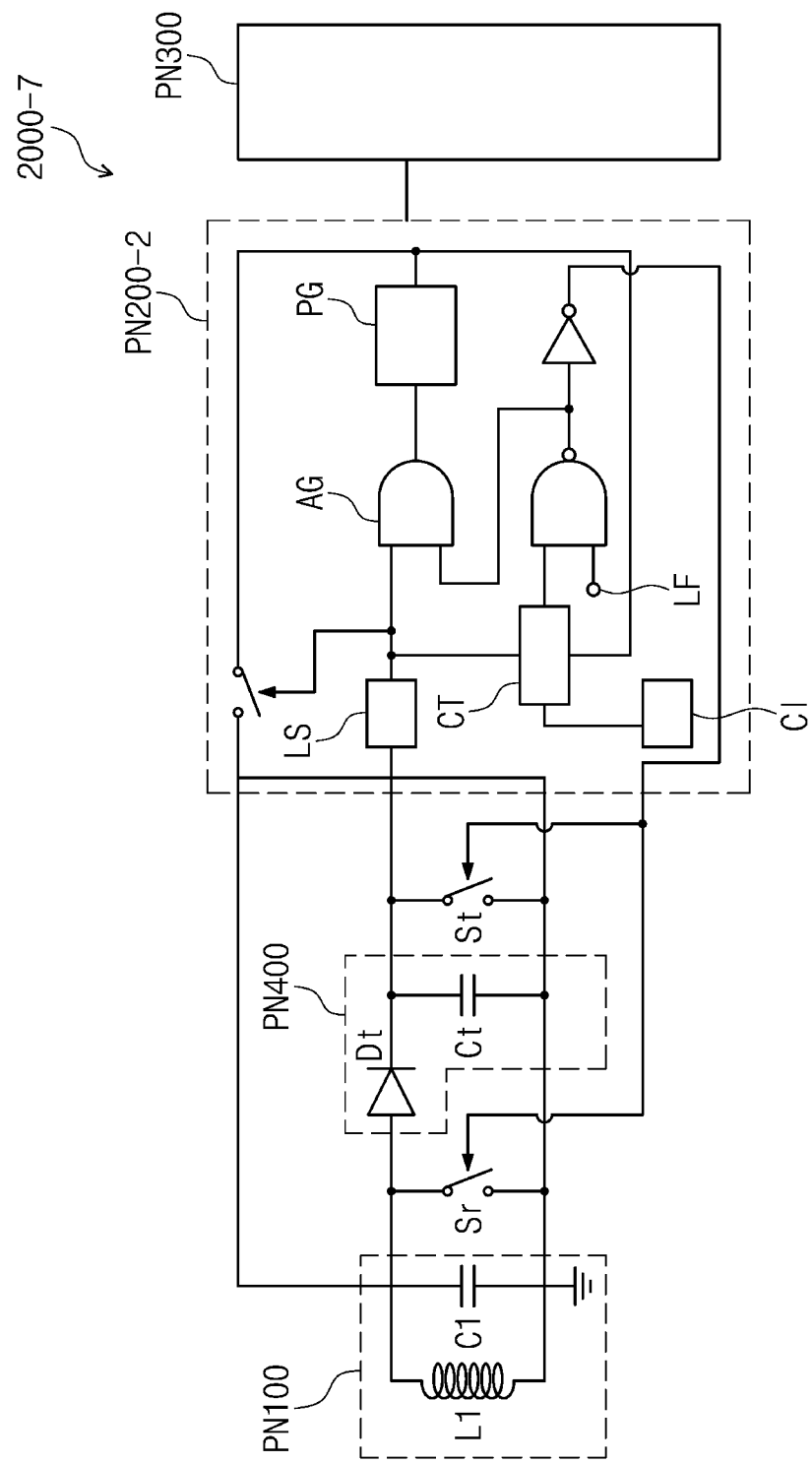

FIGS. 15A and 15B are views illustrating an input device, according to an embodiment of the present disclosure. In the description of FIGS. 15A and 15B, the same reference numerals may be assigned to the same components described with reference to FIG. 9, and thus to the extent that a detailed description of one or elements has been omitted, it may be understood that those elements are at least similar to corresponding elements described elsewhere within the specification.

Referring to FIGS. 8 and 15A, an input device 2000-6 may include the resonance circuit unit PN100, a control unit PN200-1, the power supply unit PN300, and the rectifier circuit PN400.

The control unit PN200-1 may further include a pulse adjustment unit PC. The pulse adjustment unit PC may be connected with the pulse generator PG. The pulse adjustment unit PC may change the phase and frequency of the second driving signal S2.

The resonance circuit unit PN100 may be charged by the second driving signal S2. The resonance circuit unit PN100 may generate a second magnetic field based on the second driving signal S2. The electronic device 1000 (see FIG. 1A) may detect the input S3 generated by the input device 2000-5 based on the second driving signal S2 for charging the resonance circuit unit PN100.

The electronic device 1000 (see FIG. 1A) may extract information from the input S3 based on the delayed phase.

Referring to FIGS. 8 and 15B, an input device 2000-7 may include the resonance circuit unit PN100, a control unit PN200-2, the power supply unit PN300, and the rectifier circuit PN400.

The control unit PN200-2 may further include a counting unit C1. The counting unit C1 may be connected to the counter CT. The counting unit C1 may change the number of pulses of the second driving signal S2.

The resonance circuit unit PN100 may be charged by the second driving signal S2. The resonance circuit unit PN100 may generate a second magnetic field based on the second driving signal S2. The electronic device 1000 (see FIG. 1A) may detect an input S3 generated by the input device 2000 based on the second driving signal S2 for charging the resonance circuit unit PN100.

The electronic device 1000 (see FIG. 1A) may extract information from the input S3 based on the number of pulses of the second driving signal S2.

As described above, a resonance circuit unit may be charged by a first driving signal of a sensing layer. An input device may communicate with an electronic device based on the charged resonance circuit unit. The electronic device and the input device might not require a communication time for synchronization. For example, the communication time between the electronic device and the input device may be reduced. An interface device may have a high report rate. Accordingly, the interface device may secure a sufficient report rate.

According to an embodiment of the present disclosure, when a trigger signal of the input device reaches a predetermined level, a driving control unit may generate a second driving signal based on a power supply. For example, even though the resonance circuit unit is not sufficiently charged by a first driving signal, the resonance circuit unit may be charged through the second driving signal. A time required to provide the first driving signal of the sensing layer may be shortened. An interface device may have a high report rate. Accordingly, the interface device may secure a sufficient report rate. Furthermore, power consumption of the electronic device may be reduced.

According to an embodiment of the present disclosure, the resonance circuit unit may be charged by a second driving signal. The second driving signal may be generated based on a power supply provided from a power supply unit. As the power is supplied, an output corresponding to an input generated by using the input device may be maintained uniformly. Accordingly, the sensitivity of the electronic device to the input device may be increased.

While the present disclosure has been described with reference to embodiments thereof, it will be apparent to those of ordinary skill in the art that various changes and modifications may be made thereto without departing from the spirit and scope of the present disclosure.

What is claimed is:

1. An interface device, comprising:
an electronic device; and
an input device in communication with the electronic device,
wherein the electronic device includes:
a display layer; and
a sensing layer disposed under the display layer, the sensing layer configured to transmit a first driving signal to the input device and to sense an input generated by the input device,
wherein the input device includes:
a resonance circuit in which a first magnetic field is generated based on the first driving signal;
a controller configured to control the resonance circuit; and
a power supply configured to provide power to the controller,
wherein the controller includes a pulse generator configured to generate a plurality of pulses from the provided power and send the plurality of pulses to the resonance circuit to generate a second magnetic field therefrom, and wherein the sensing layer senses the input based on the second magnetic field.

2. The interface device of claim 1, wherein the controller includes:
   a driving controller configured to transmit a second driving signal, which includes the plurality of pulses, to the resonance circuit; and
   a discharge controller configured to discharge the resonance circuit.

3. The interface device of claim 2, wherein the controller includes:
   a level shifter connected to the resonance circuit and configured to receive a start signal;
   a counter connected to the level shifter and configured to start counting when receiving the start signal;
   the pulse generator connected to the counter and the level shifter and configured to generate the second driving signal including the plurality of pulses; and
   a logic chip connected to the level shifter, the counter, and the pulse generator.

4. The interface device of claim 3, wherein the controller further includes a pulse adjuster circuit connected to the pulse generator and configured to change a phase and a frequency of the plurality of pulses of the second driving signal.

5. The interface device of claim 3, wherein the controller further includes a counting circuit connected to the counter and configured to change a number of pulses of the plurality of pulses of the second driving signal.

6. The interface device of claim 2, wherein the second magnetic field is generated based on the plurality of pulses of the second driving signal.

7. The interface device of claim 2, wherein the resonance circuit includes:
   a first capacitor configured to store a flow of a current induced by the first driving signal and the second driving signal as an electric field; and
   a first inductor electrically connected to the first capacitor and configured to store the flow of the current induced by the first driving signal and the second driving signal as a magnetic field.

8. The interface device of claim 7, wherein the input device further includes a second capacitor electrically connected between the resonance circuit and the driving controller.

9. The interface device of claim 8, wherein the input device further includes a second inductor electrically connected between the resonance circuit and the driving controller.

10. The interface device of claim 9, wherein, when the first driving signal is provided from the sensing layer, the second inductor is electrically connected to the resonance circuit, and wherein, when the second driving signal is provided from the driving controller, the second inductor is electrically isolated from the resonance circuit.

11. The interface device of claim 7, wherein the first capacitor is connected in series between the driving controller and the first inductor.

12. The interface device of claim 8, wherein the second capacitor is a variable capacitor.

13. The interface device of claim 1, wherein the sensing layer includes a digitizer.

14. A method for driving an interface device, the method comprising:
   providing an electronic device and an input device including a controller and a resonance circuit;
   transmitting, by the electronic device, a first driving signal to the input device;
   charging the resonance circuit by the first driving signal;
   generating, by the input device, a second driving signal;
   charging the resonance circuit by the second driving signal; and
   detecting, by the electronic device, an input generated by the input device based on the second driving signal for charging the resonance circuit,
   wherein the generating of the second driving signal includes:
      starting counting;
      generating a pulse; and
      when the counting reaches a limit value, stopping the counting.

15. The method of claim 14, further comprising:
   discharging the resonance circuit,
   wherein the discharging of the resonance circuit is performed after the detecting, by the electronic device, of the input.

16. The method of claim 15, wherein the discharging of the resonance circuit is performed after the stopping of the counting.

17. The method of claim 14, wherein the charging of the resonance circuit by the first driving signal includes:
   resonating the resonance circuit at a first frequency, and
   wherein the charging of the resonance circuit by the second driving signal includes:
   resonating the resonance circuit at a second frequency different from the first frequency.

18. The method of claim 14, further comprising:
   when a trigger signal reaches a predetermined level, operating the controller,
   wherein a level of the trigger signal is changed based on charging the resonance circuit.

19. The method of claim 18, wherein the operating of the controller is performed between the charging the resonance circuit by the first driving signal and the generating of the second driving signal.

* * * * *